(12) United States Patent
Aliyu et al.

(10) Patent No.: US 10,495,541 B2
(45) Date of Patent: Dec. 3, 2019

(54) SYSTEMS AND METHODS OF ENERGY AWARE GAS LEAK DETECTION

(71) Applicant: KING FAHD UNIVERSITY OF PETROLEUM AND MINERALS, Dhahran (SA)

(72) Inventors: Farouq Muhammad Aliyu, Damaturu (NG); Tarek Sheltami, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 463 days.

(21) Appl. No.: 15/284,618

(22) Filed: Oct. 4, 2016

(65) Prior Publication Data
US 2018/0094999 A1    Apr. 5, 2018

(51) Int. Cl.
| | |
|---|---|
| G06F 15/16 | (2006.01) |
| G01M 3/04 | (2006.01) |
| H04L 29/08 | (2006.01) |
| H04L 29/12 | (2006.01) |

(52) U.S. Cl.
CPC ........... *G01M 3/04* (2013.01); *H04L 61/6022* (2013.01); *H04L 67/12* (2013.01)

(58) Field of Classification Search
CPC ...................................................... H04L 67/12
See application file for complete search history.

(56) References Cited

U.S. PATENT DOCUMENTS

| | | | | |
|---|---|---|---|---|
| 6,270,651 B1* | 8/2001 | Essalik | .............. | G01N 27/4073 |
| | | | | 204/424 |
| 8,194,636 B1* | 6/2012 | Doherty | ................ | H04J 3/0652 |
| | | | | 370/350 |
| 2008/0168826 A1 | 7/2008 | Saidi et al. | | |
| 2011/0161044 A1* | 6/2011 | Gonia | .................... | G08B 21/14 |
| | | | | 702/150 |
| 2013/0095867 A1* | 4/2013 | Kim | ........................ | H04W 4/38 |
| | | | | 455/500 |
| 2014/0304553 A1* | 10/2014 | Gondi | ................. | G06F 11/0793 |
| | | | | 714/39 |
| 2014/0320296 A1* | 10/2014 | Thurber | ................ | G08B 21/14 |
| | | | | 340/632 |
| 2015/0112883 A1* | 4/2015 | Orduna | ................ | G06Q 50/265 |
| | | | | 705/325 |

(Continued)

FOREIGN PATENT DOCUMENTS

| | | |
|---|---|---|
| CN | 101888413 A | 11/2010 |
| CN | 204302214 U | 4/2015 |
| JP | 2004-219081 A | 8/2004 |

OTHER PUBLICATIONS

Andrey Somov, et al., "A wireless sensor-actuator system for hazardous gases detection and control", Sensors and Actuators A: Physical, vol. 2010, 2014, pp. 157-164.

*Primary Examiner* — Douglas B Blair
(74) *Attorney, Agent, or Firm* — Oblon, McClelland, Maier & Neustadt, L.L.P.

(57) ABSTRACT

An energy aware gas detection system can include relay nodes and gas sensor nodes operating based on an adaptive sleep cycle, each of the gas sensor nodes can include gas sensors configured to detect methane, carbon monoxide, and hydrogen sulfide. Additionally, the system can also include actuator nodes to operate gas valves and a gateway node to be a bridge between the relay nodes and a remote device communicably coupled to a network.

20 Claims, 11 Drawing Sheets

(56) References Cited

U.S. PATENT DOCUMENTS

| | | | |
|---|---|---|---|
| 2016/0018356 A1* | 1/2016 | Shankar | G01N 27/12 |
| | | | 205/775 |
| 2016/0127878 A1* | 5/2016 | Clarke | G08B 27/005 |
| | | | 705/324 |
| 2016/0294630 A1* | 10/2016 | Verma | H04L 41/12 |
| 2017/0111982 A1* | 4/2017 | Meitl | H05B 37/0281 |
| 2017/0187541 A1* | 6/2017 | Sundaresan | H04L 67/12 |
| 2017/0285623 A1* | 10/2017 | Figoli | G05B 19/41855 |
| 2018/0023828 A1* | 1/2018 | Lutz | F24F 11/30 |
| | | | 700/276 |
| 2019/0041347 A1* | 2/2019 | Matsukura | G01N 25/18 |
| 2019/0222651 A1* | 7/2019 | Sundaresan | G01N 27/00 |

\* cited by examiner

SYSTEMS AND METHODS OF ENERGY AWARE GAS LEAK DETECTION

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gas leak detection is important for safety. Monitoring areas where potential gas leaks can occur can be done automatically to increase efficiency and minimize human interaction. Some locations may include many types of gas that could potentially leak.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, a gas detection system can include one or more gas sensor nodes operating based on an adaptive sleep cycle and including one or more gas sensors configured to detect one or more gas leaks. Additionally, the system can include one or more actuator nodes communicably coupled to a gas valve, a gateway node communicably coupled to a remote device, and a network communicably coupling the one or more gas sensor nodes, the one or more actuator nodes, the gateway node, and the remote device. The remote device can include processing circuitry configured to receive a packet via the gateway node, the packet including gas information from the one or more gas sensor nodes, and activate the one or more actuator nodes based on the gas information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
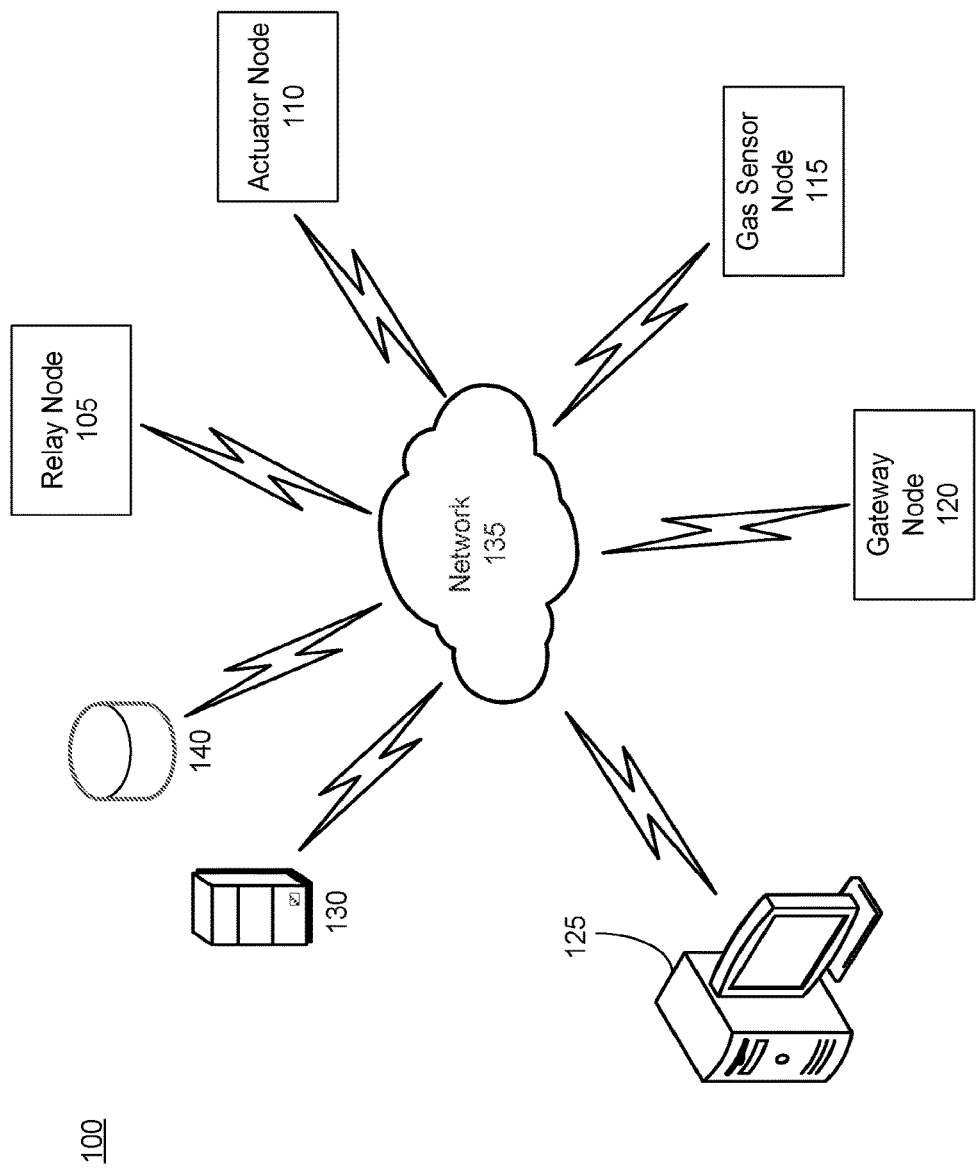
FIG. 1A depicts an exemplary schematic diagram of a system for gas leak detection according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1A depicts an exemplary schematic diagram of a gas leak detection system 100 (herein referred to as system 100) according to one or more aspects of the disclosed subject matter. The system 100 can include a relay node 105, an actuator node 110, a gas sensor node 115, a gateway node 120, a remote device 125, a server 130, a database 140, and a network 135 communicably coupling the relay node 105, the actuator node 110, the gas sensor node 115, the gateway node 120, the remote device 125, the server 130, and the database 140.

The relay node 105 can represent one or more relay nodes communicably coupled to the actuator node 110, the gas sensor node 115, the gateway node 120, the remote device 125, the server 130, and the database 140 via the network 135. The relay node 105 can act as a mesh of one or more relay nodes 105 to assist in communication throughout a wireless sensor network 160. The wireless sensor network 160 can include the relay node(s) 105, the actuator node(s) 110, the gas sensor node(s) 115, and the gateway node(s) 120. For example, the wireless sensor network 160 can transmit information across relay nodes 105 to forward packets of information throughout the system 100. The packets can contain gas leak information as further described herein.

The actuator node 110 can represent one or more actuator nodes communicably coupled to the relay node 105, the gas sensor node 115, the gateway node 120, the remote device 125, the server 130, and the database 140 via the network 135. The actuator node 110 can be configured to receive signals corresponding to one or more of opening and closing a gas valve in response to detection of a gas leak.

The gas sensor node 115 can represent one or more gas sensor nodes communicably coupled to the relay node 105, the actuator node 110, the gateway node 120, the remote device 125, the server 130, and the database 140 via the network 135. The gas sensor node 115 can detect gas levels and transmit the detected gas levels and location of the gas sensor node 115 to the gateway node 120 via the relay nodes 105 and the wireless network 135.

The gateway node 120 can represent one or more gateway nodes communicably coupled to the relay node 105, the actuator node 110, the gas sensor node 115, the remote device 125, the server 130, and the database 140 via the network 135. The gateway node 120 can receive incoming data for the relay nodes 105, as well as be a gateway/bridge between the wireless sensor network 160 and a local area network or a wide area network (e.g., network 135) to which the remote device 125 is connected. The stored data can be accessed and processed by devices with more resources, such as in the remote device 125 and/or a remotely located server 130.

The remote device 125 can represent one or more remote devices 125 communicably coupled to the relay node 105, the actuator node 110, the gas sensor node 115, the gateway node 120, the server 130, and the database 140 via the network 135. The remote device 125 can include an interface, such as a monitor to display gas leak information, for example.

The server 130 can represent one or more servers 130 communicably coupled to the relay node 105, the actuator node 110, the gas sensor node 115, the gateway node 120, the remote device 125, and the database 140 via the network 135. The server 130 can receive signals from the gateway node 120 and/or the remote device 125 to cause the server 130 to operate the system 100.

The database 140 can represent one or more databases communicably coupled to the relay node 105, the actuator node 110, the gas sensor node 115, the gateway node 120, the remote device 125, and the server 130 via the network 135. The database 140 can store various information including gas leak information. For example, the database 140 can store the gas levels detected, the location of the gas sensor node(s) 115 that detected the gas leak, and the like.

The wireless sensor network 160 can be the wireless sensor network through which the relay node 105, actuator node 110, gas sensor node 115, gateway node 120, remote device 125, server 130, and database 140 communicate. The network 160 can be an adhoc network, such as a ZigBee network, for example.

Figure 1B:
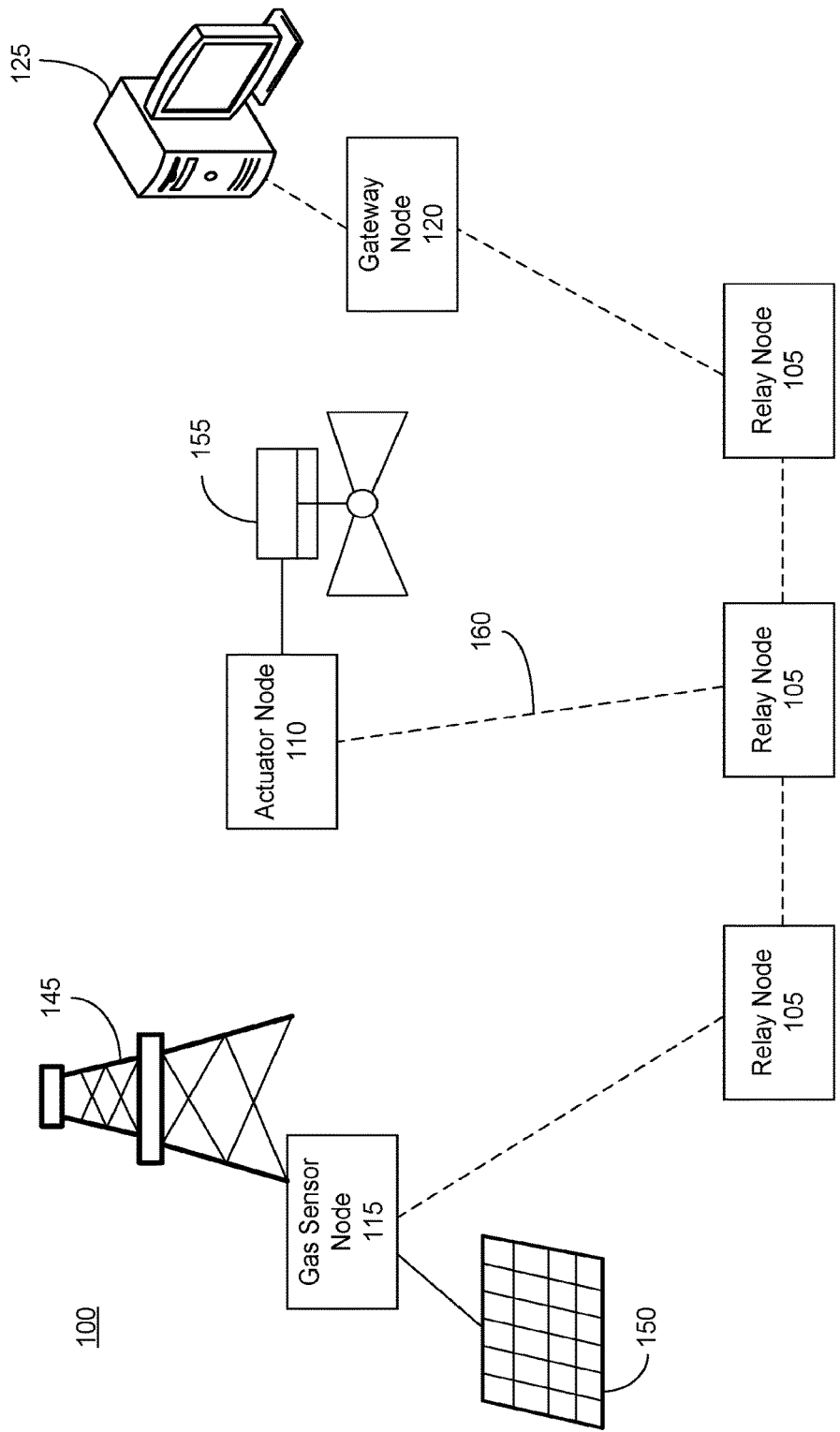
FIG. 1B depicts an exemplary implementation of a system for gas leak detection according to one or more aspects of the disclosed subject matter.

FIG. 1B depicts an overview of an exemplary implementation of the system 100 according to one or more aspects of the disclosed subject matter. The gas sensor node 115 can be coupled to a solar panel 150, wherein the solar panel 150 can represent one or more solar panels. The solar panel 150 can provide power to the gas sensor node 115. The gas sensor node 115 can be located in an area where quick and accurate gas leak detection can be crucial for safety, such as an oil rig 145, for example. The actuator node 110 can be communicably coupled to a gas valve 155, wherein the gas valve 155 can represent one or more gas valves 155, each gas valve 155 coupled to an actuator node 110. The gas valve 155 may be at the oil rig 145. The actuator node 110 can switch the gas valve 155 between an on and off position, thereby allowing gas to flow and stopping gas flow, respectively. The relay nodes 105, actuator nodes 110, gas sensor nodes 115, and gateway nodes 120 can create the wireless sensor network 160 configured to receive and transmit information throughout the system 100 via a ZigBee network. The ZigBee network can create an IEEE 802.15.4-based personal area network, for example. The relay nodes 105 can communicate with a local area network or a wide area network via the gateway node 120, such that the gateway node 120 can act as a bridge between the wireless sensor network 160 and the remote device 125, for example. The relay nodes 105, gas sensor node 115, actuator node 110, and gateway node 120 can be positioned throughout the oil rig 145 to create the wireless sensor network 160.

For example, the system 100 can be implemented in a situation when one or more of a Methane, Carbon Monoxide, and Hydrogen Sulfide leak is detected in an area in which the system 100 is installed. The gas sensor node 115 can calculate an amount of the leak in parts per million. The gas levels can be sent through the wireless sensor network 160 to the remote device 125, the remote device 125 receiving the gas levels via the gateway node 120. The remote device 125 can store any information relating to the gas levels, gas leak information, and the like, locally and/or in a remote database (e.g., database 140). Additionally, the gas level/leak information can be displayed via the remote device 125. In one aspect, the remote device 125 can transmit a signal to the actuator node 110 via the gateway node 120 and the relay nodes 105. The relay nodes 105 can transmit the signal to the actuator node 110. The signal transmitted to the actuator node 110 can correspond to a command to switch the gas valve 155 to an off position, thereby shutting down the gas valve 155 to stop the gas leak. One or more gas valves 155 can be shut down to stop the gas leak. For example, one or more gas valves 155 determined to be in a position corresponding to the gas leak can be shut down. In another aspect, all gas valves 155 can be shut down when a gas leak is detected.

Figure 2:
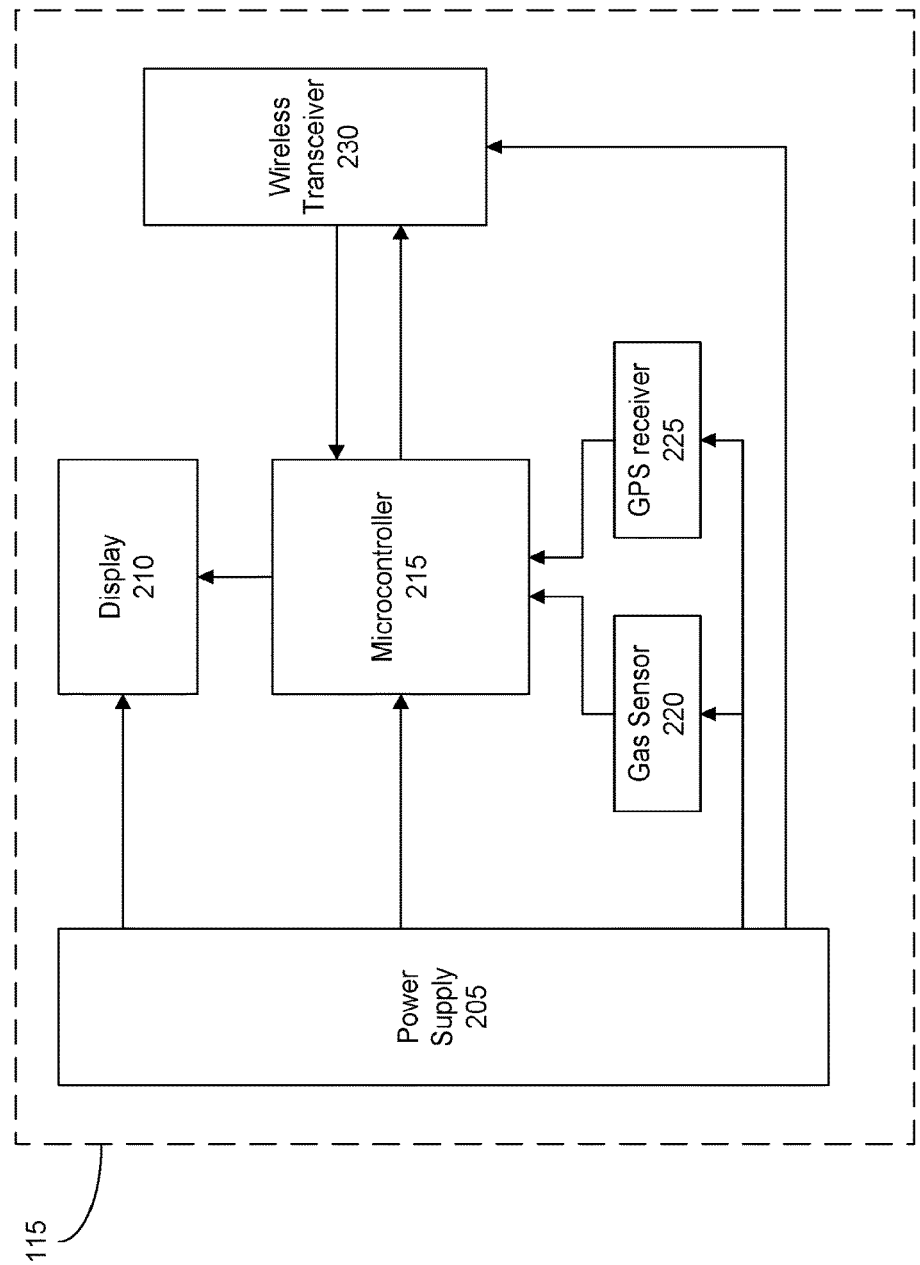
FIG. 2 depicts a block diagram of a gas sensor node according to one or more aspects of the disclosed subject matter.

FIG. 2 depicts a block diagram of the gas sensor node 115 according to one or more aspects of the disclosed subject matter. The gas sensor node 115 includes a power supply 205, a display 210, a microcontroller 215, a gas sensor 220, a GPS receiver 225, and a wireless transceiver 230. The power supply 205 can provide power to the gas sensor node 115. The power supply 205 can use the solar panel 150 and/or batteries as a power source. However, the gas sensor node 115 may use the solar panel 150 as a first choice of power supply, reserving the batteries for a situation when the solar panel 150 cannot source the needed energy. The power supply 205 can be managed by the microcontroller 215. The gas sensor 220 can detect one or more of Methane, Carbon Monoxide, and Hydrogen Sulfide via MQ4, MQ7, and MQ136 semiconductor sensors, respectively. The display 210 can be a HITACHI HD44780 LCD display, for example. The display 210 can display gas levels of any gas detected, such as in a gas leak, for example. The gas levels can be displayed on the display 210 in parts per million. The microcontroller 215 can receive gas level information as an analogue voltage signal from the gas sensor 220. The microcontroller 215 can convert the analogue voltage signal received from the gas sensor 220, for example, to digital in parts per million via the following equations:

$$PPM_{CH4} = 7476.76 \, e^{\frac{-2.0118 R_s}{Ro}};$$ (Eq. 1)

$$PPM_{CO} = 3.124 \times 10^{12} e^{\frac{-5.5886 R_s}{Ro}};$$ (Eq. 2)

$$PPM_{H2S} = 1473.62 \times e^{\frac{-3.3286 R_s}{Ro}};$$ (Eq. 3)

wherein CH4 is Methane, CO is Carbon Monoxide, H2S is Hydrogen Sulfide, $R_s$ is an electrical resistance of the sensor, and Ro is an electrical resistance of the sensor at zero parts per million. After the microcontroller 215 converts the analogue voltage signal to parts per million, the gas levels can be displayed on display 210 in parts per million.

The microcontroller 215 can also receive signals from the GPS receiver 225 for localization of the gas sensor node 115. The location of the gas sensor node 115 can then be displayed via the display 210. The wireless transceiver 230 can receive gas levels and location of the gas sensor node 115 from the microcontroller 215 to be transmitted to the remote device 125, for example. Additionally, the wireless transceiver 230 can receive power supply information from the power supply 205 to be transmitted to the remote device 125, for example the power supply information includes the energy of the battery as a percentage. The transceiver 230 can also transmit diagnostic information of the gas sensor node 115. For example, when one of the gas sensors is damaged or the display is broken, the transceiver 230 can transmit a signal corresponding to the relevant information (e.g., gas sensor damaged) to the remote device 125 so that an alert can be displayed.

The microcontroller 215 can carry out instructions to perform or cause performance of various functions, operations, steps or processes of the system 100 and/or the gas sensor node 115. The microcontroller 215 can be configured to store information in memory, operate the gas sensor node 115, receive and send information in the form of signal(s) via the wireless transceiver 230, and the like.

Figure 3:
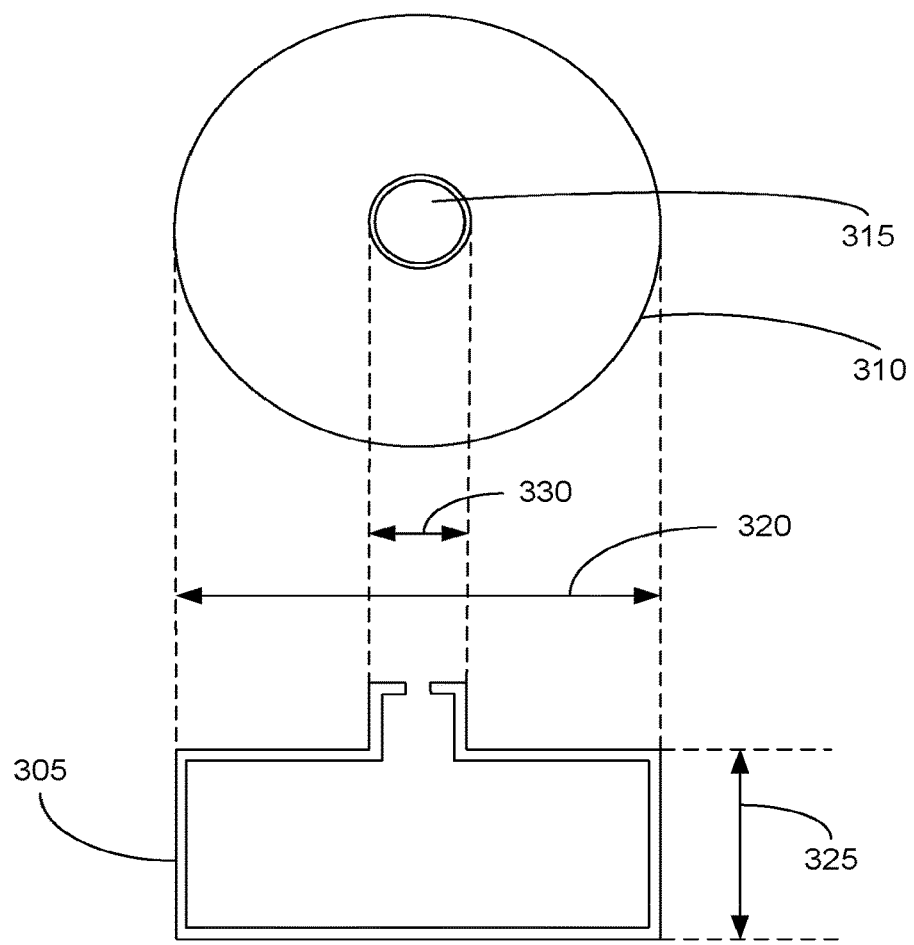
FIG. 3 depicts a perspective view of a gas sensor casing according to one or more aspects of the disclosed subject matter.

FIG. 3 depicts a perspective view of a gas sensor casing 300 according to one or more aspects of the disclosed subject matter. The gas sensor casing 300 can include a casing body 305, a casing cover 310, and a hydrophobic filter 315. The gas sensor casing 300 can be a range of sizes. In one aspect, a height 325 of the casing body 305 can be one inch, a width 320 of the casing body 305 and the casing cover 310 can be two and three-eighths inches, and a filter width 330 of the hydrophobic filter 315 can be one inch. The casing cover 310 can be placed on the casing body 305 such that the hydrophobic filter 315 covers any opening in the casing body 305.

The gas sensor casing 300 can be configured to contain heat generated by the gas sensors 220, as well as harvest heat external to the gas sensor casing 300 to maintain a higher temperature within the gas sensor casing 300, thereby reducing the time required to heat the gas sensor 220. The gas sensor casing 300 can be a thick-walled container made of marine grade aluminum or marine grade stainless steel, for example. The gas sensors 220 can be semi-conductor sensors. The gas sensors 220 require heating up to 450° C. for optimal performance and include a built-in heater to achieve the optimal operating temperature. During the heating process, some of the heat is radiated from the gas sensors 220. The heat that is lost can be trapped by the gas sensor casing 300. Additionally, ambient heat from the surrounding area can be harvested through conduction, thereby increasing the temperature inside the gas sensor casing. As the gas sensor node 115 transitions from a sleep mode to an active mode, as further described herein, the gas sensors 220 do not need to be heated from 0° C. to 450° C. Rather, the gas sensors 220 can be heated from X° C. to 450° C., where X° C. can be a current temperature of the gas sensors 220 maintained due to the heat harvested and contained via the gas sensor casing 300. Therefore, the gas sensor casing 300 can reduce the amount of time it takes to heat the gas sensors 220 to the optimal operating temperature.

Figure 4:
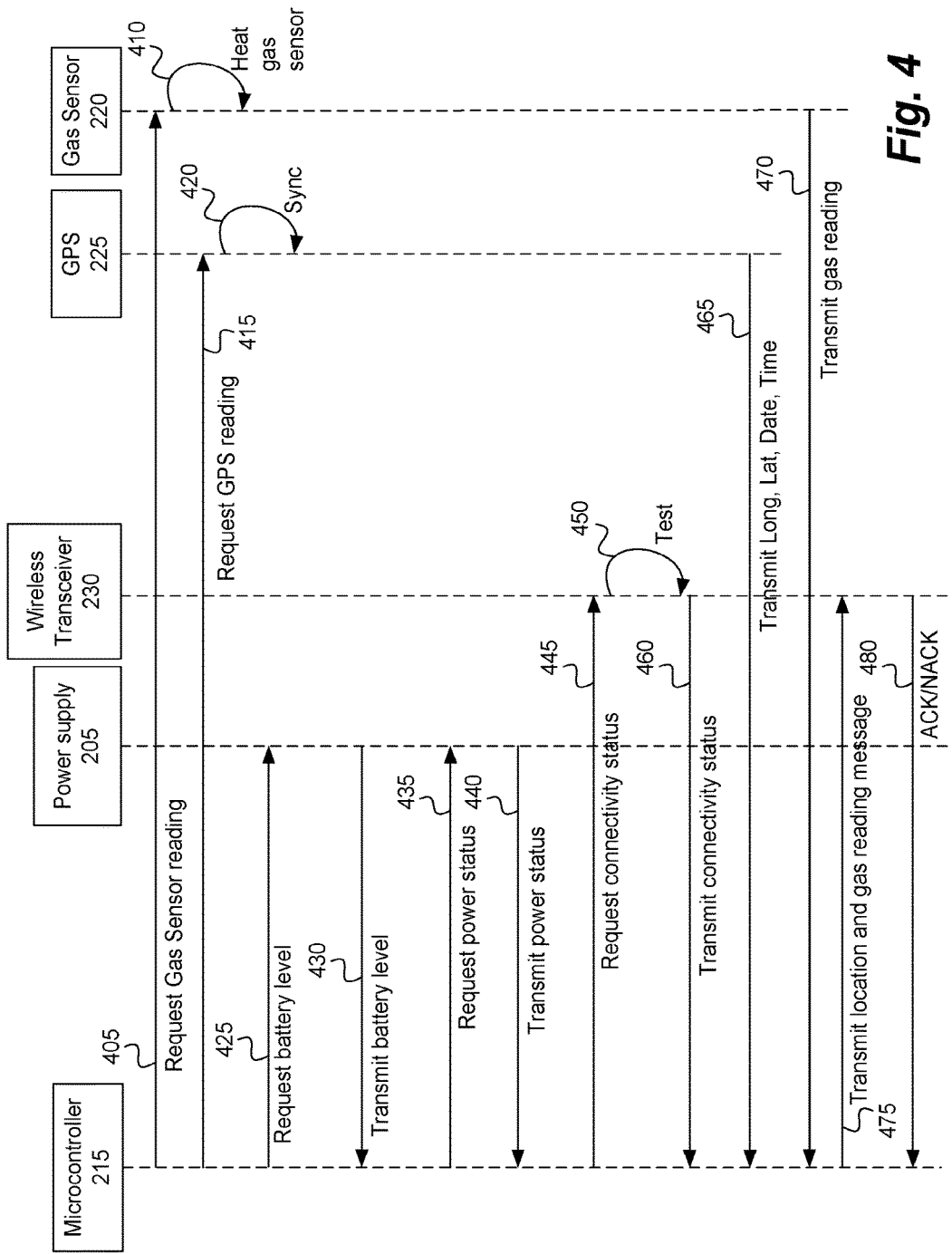
FIG. 4 depicts a swim lane diagram for operation of a gas sensor node according to one or more aspects of the disclosed subject matter.

FIG. 4 depicts a swim lane diagram for operation of the gas sensor node 115 according to one or more aspects of the disclosed subject matter. When the gas sensor node 115 is turned on, the microcontroller 215 can request a gas sensor reading 405 from the gas sensor 220 and begins gas sensor heating 410 in the gas sensor 220. The gas sensor 220 can transmit a gas reading 470 to the microcontroller 215 when the gas sensor 220 is heated to the optimal operational temperature. The microcontroller 215 can request a GPS reading 415 and synchronize 420 the GPS receiver 225 with GPS satellites.

When the synchronization 420 is complete, the GPS receiver 225 can transmit a longitude, latitude, date, and time 465 associated with the gas sensor node 115 to the microcontroller 215. The microcontroller 215 can then request a battery level 425 from the power supply 205 and the power supply 205 can transmit a batter level 430 to the microcontroller 215. Additionally, the microcontroller can request a power status 435 from the power supply 205, and the power supply 205 can transmit a power status 440 to the microcontroller 215. The power status 435 can be a report verifying that all the components of the gas sensor node 115 are powered and that the power supply 205 is operating correctly.

The microcontroller 215 can request connectivity status 445 from the wireless transceiver 230. The wireless transceiver 230 can then perform a test 450 by sending a test message and receiving ACK/NACK over the wireless sensor network 160 as would be known by one or ordinary skill in the art. The wireless transceiver 230 can then transmit the connectivity status to the microcontroller 230. The microcontroller 215 can then transmit the location and gas sensor readings 475 via the wireless transceiver 230 to the gateway node 120.

Figure 5:
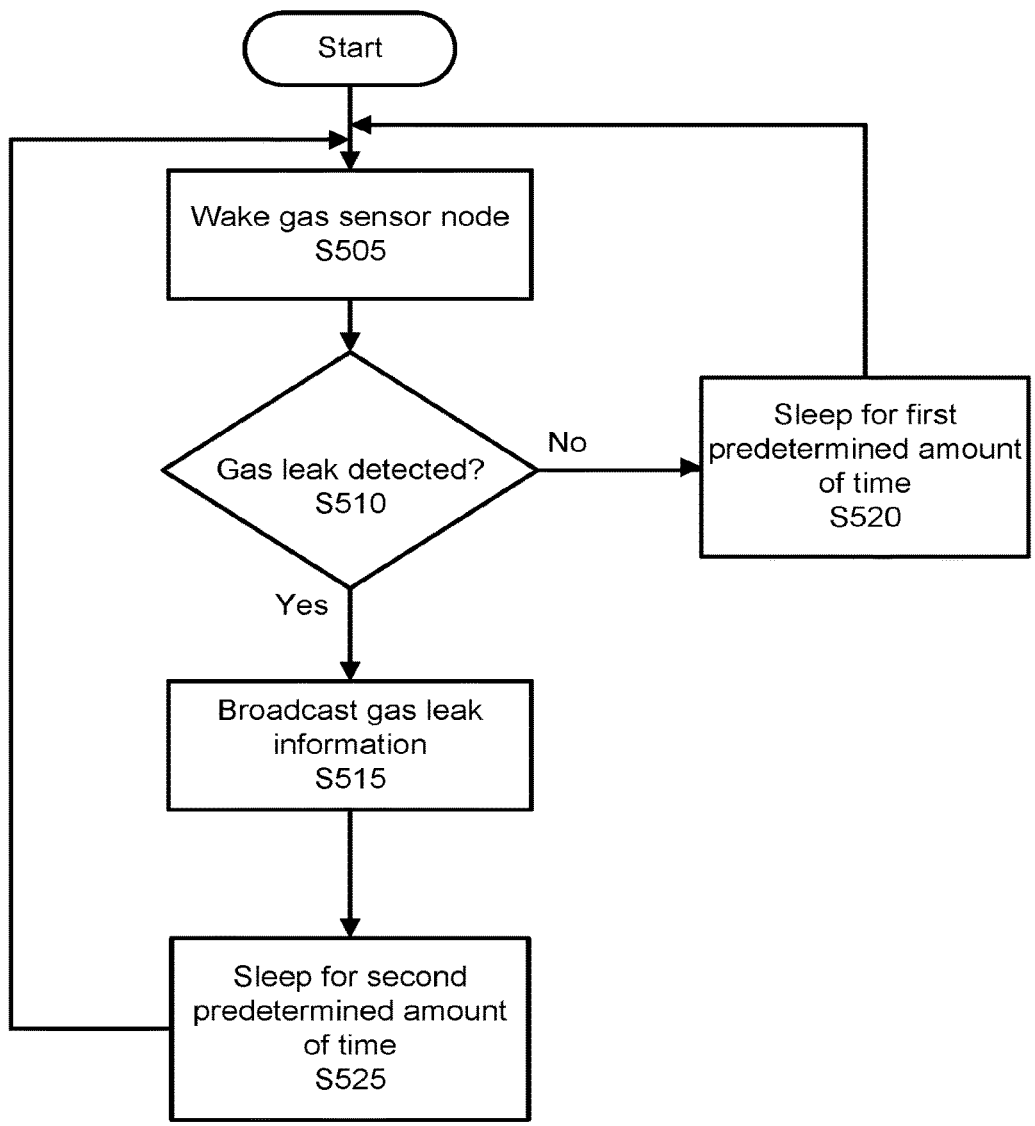
FIG. 5 is an algorithmic flowchart of a method for an adaptive sleep cycle of a gas sensor node according to one or more aspects of the disclosed subject matter.

FIG. 5 is an algorithmic flowchart of a method for an adaptive sleep cycle of the gas sensor node according to one or more aspects of the disclosed subject matter.

In S505, the gas sensor node 115 can be woken up (i.e., turned on or awoken from a sleep mode).

In S510, it can be determined if a gas leak is detected. If a gas leak is detected, then the gas leak information can be broadcast in S515. However, if no gas leak is detected, then the gas sensor node 115 can sleep for a first predetermined time (e.g., two minutes) in S520.

In S520, the gas sensor node 115 can sleep for the first predetermined time. Because no gas leak was detected, the sleep conserves energy (e.g., save battery power) and increases the lifetime of the gas sensor node 115. After the first predetermined time, the process can return to S505 to wake the gas sensor node 115.

In S515, the gas leak information can be broadcast to the remote device 125, for example, via the wireless sensor network 160 and the gateway node 120. The gas leak information can be broadcast in response to the gas leak being detected in S510. The gas leak information can include the gas levels as determined by the gas sensor 220 and the location of the gas sensor node 115 that detected the gas leak.

In S525, the gas sensor 115 can sleep for a second predetermined time less than the first predetermined time (e.g., one minute) from when the gas leak is detected in S510. Because the gas leak has been detected, the gas levels can be measured more frequently by waking the gas sensor node 115 more frequently. Receiving more frequent measurements of the gas leak can allow for a more precise determination of the gas levels and location of the leak over time. After the second predetermined time, the process can return to S505 to wake the gas sensor 115. The adaptive sleep cycle of the gas sensor node 115 can conserve energy and increase the lifetime of the gas sensor node 115 by sleeping for the first predetermined time when no gas leak is detected and sleeping for the second predetermined time when the gas leak is detected.

Figure 6:
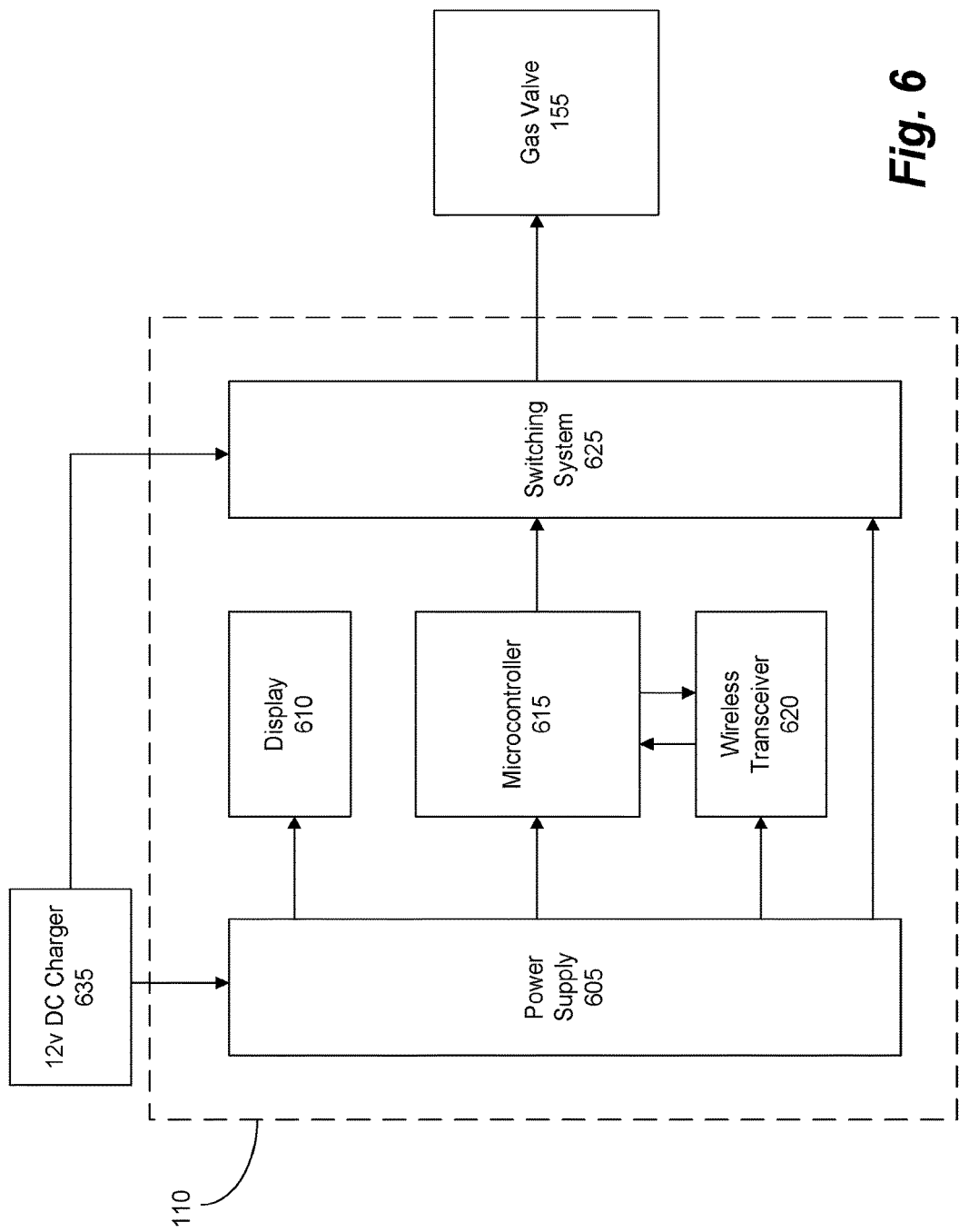
FIG. 6 depicts a block diagram of an actuator node according to one or more aspects of the disclosed subject matter.

FIG. 6 depicts a block diagram of an actuator node according to one or more aspects of the disclosed subject matter. The actuator node 110 can open and close a corresponding gas valve 155 in response to a signal received from the remote device 125, for example. The signals to open and close the gas valve 155 can be transmitted automatically in response to the gas leak being detected and/or the signals to open and close the gas valve 155 can be transmitted manually via input from input devices (e.g., keyboard, mouse, etc.) of the remote device 125.

The actuator node 110 can include a power supply 605, a display 610, a microcontroller 615, a wireless transceiver 620, and a switching system 625. The general functionality of the microcontroller 615 can be similar to the functionality of the microcontroller 215 as shown in FIG. 2. Additionally, a 12 v DC charger 635 can be coupled to the power supply 605 (which may include a battery) and the switching system 625 as a power source for each of the power supply 605 and the switching system 625. The switching system 625 can be coupled to the gas valve 155.

The power supply 605 regulates the power of the display 610, the microcontroller 615, the wireless transceiver 620, and the switching system 625. The wireless transceiver 620 can receive commands from the remote device 125, for example, as well as gas levels from the wireless sensor network 160. The commands and gas levels can be processed by the microcontroller 615 and output to the switching system 625. The switching system 625 can automatically turn the gas valve 155 on and off (i.e., open and close) based on one or more of the command received or the gas levels. The display 610 can include two light emitting diodes (LEDs) to provide information about a current position of the gas valve 155. For example, when a first LED is lit, the gas valve 155 is open. When a second LED (which could be the same color or different color that the first LED) is lit, the gas valve 155 is closed. When both the first LED and the second LED are lit at the same time, there is an error, and when neither is lit, there is no power being supplied to the actuator node 110.

Figure 7:
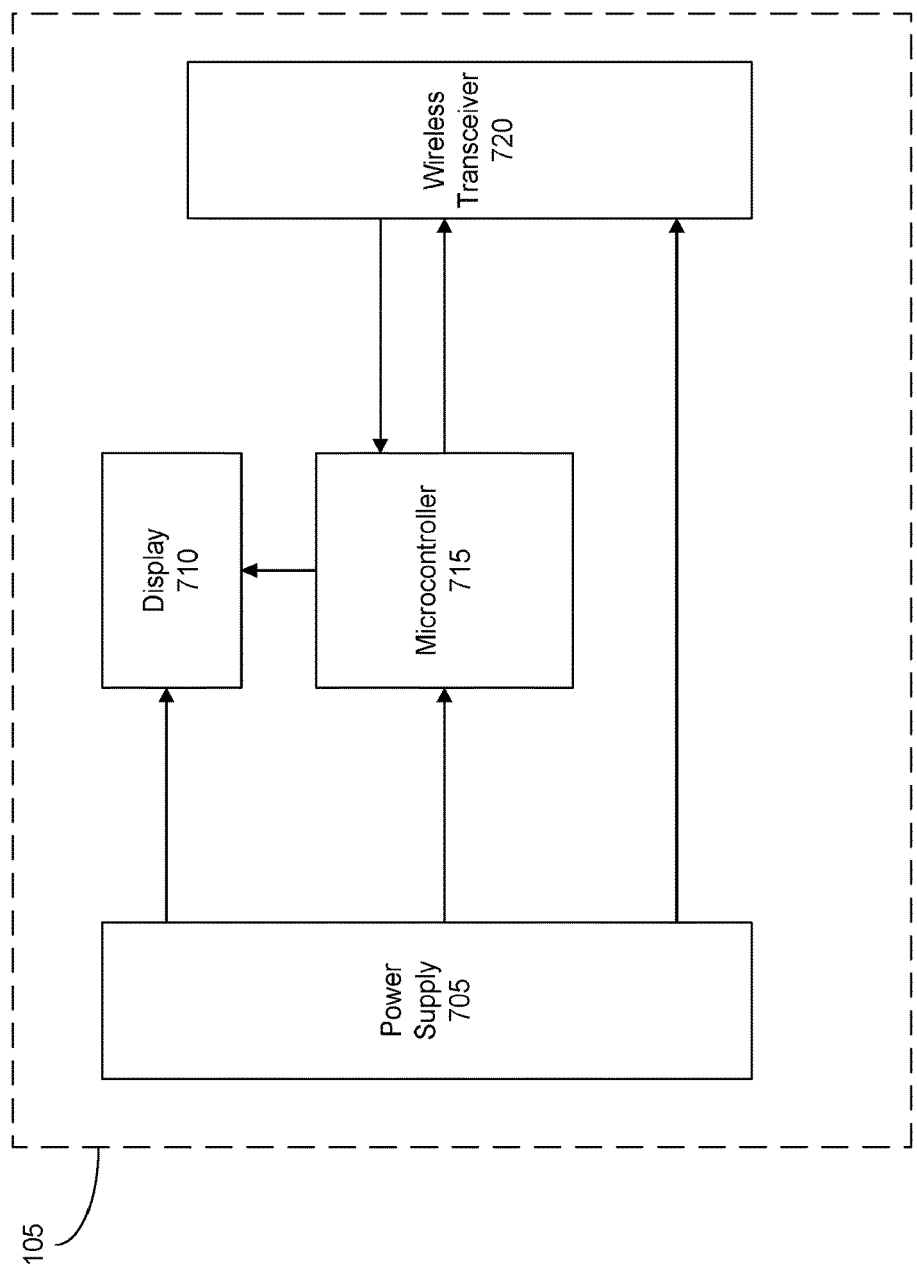
FIG. 7 depicts a block diagram of a relay node according to one or more aspects of the disclosed subject matter.

FIG. 7 depicts a block diagram of the relay node 105 according to one or more aspects of the disclosed subject matter. The relay node 105 can forward packets across the wireless sensor network 160. The packets can include the gas leak information. Therefore, the relay nodes 105 can transmit gas leak information across the wireless sensor network 160. The relay node 105 can include a power supply 705, a display 710, a microcontroller 715, and a wireless transceiver 720. The power supply 705 can manage the power supplied to the display 710, the microcontroller 715, and the wireless transceiver 720. The microcontroller 715 can communicate with the display 710 and the wireless transceiver 720. The general functionality of the microcontroller 715 can be similar to the functionality of the microcontroller 215 as shown in FIG. 2. The wireless transceiver 720 can communicate with the remote device 125, for example. The display 710 can include a first LED (e.g., red), a second LED (e.g., green), and a third LED (e.g., yellow). The red, green, and yellow LEDs being lit at the same time can correspond to notification of an error. If only the green LED is lit, the battery can be from seventy-six percent at one hundred percent capacity. If only the yellow LED is lit, the battery level can be from twenty-six percent to seventy-five percent. If only the red LED is lit, the batter level can be at twenty-five percent or less.

Figure 8A:
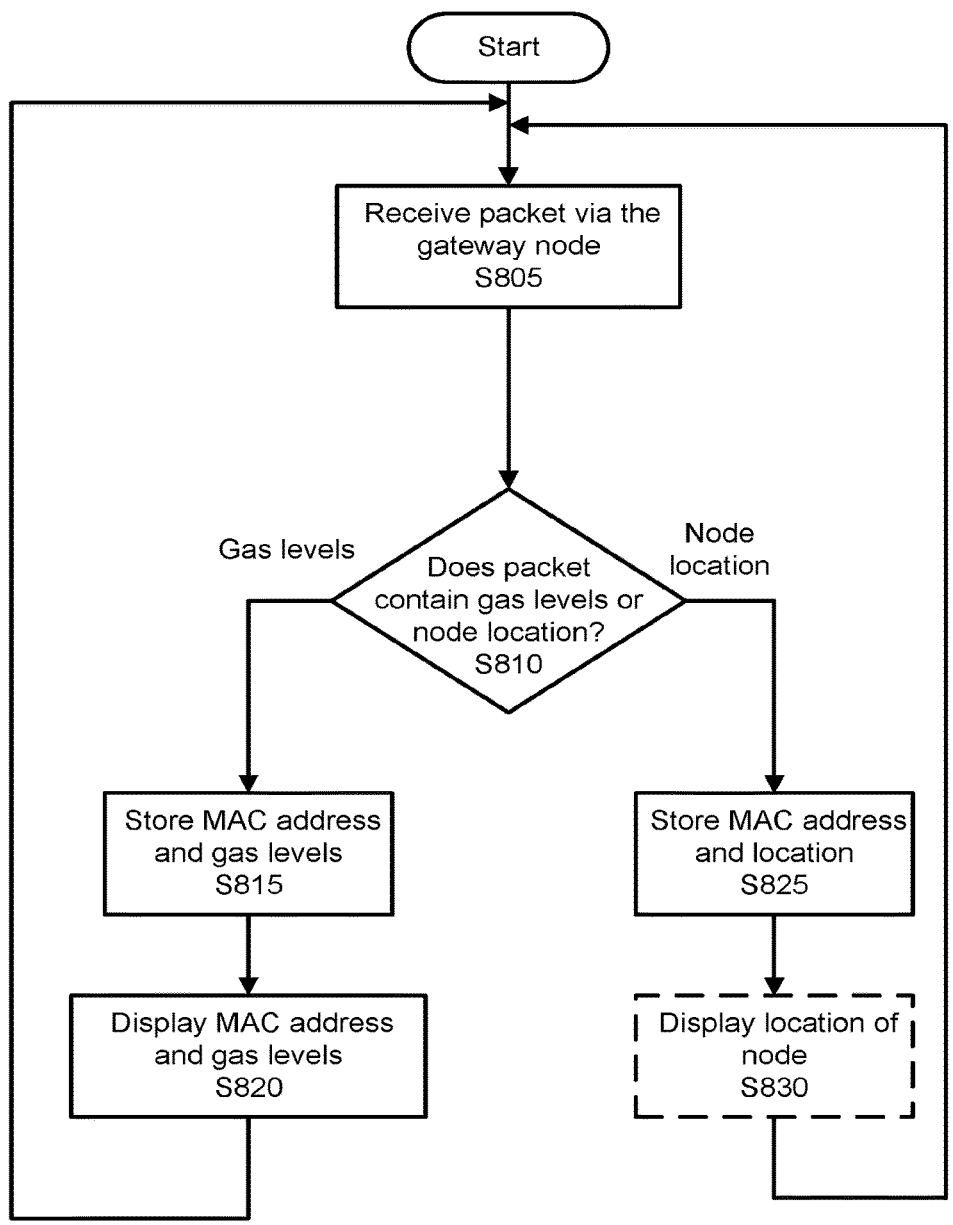
FIG. 8A is an algorithmic flowchart of a method for receiving gas leak information according to one or more aspects of the disclosed subject matter.

FIG. 8A is an algorithmic flowchart of a method for receiving gas leak information according to one or more aspects of the disclosed subject matter.

In S805, a packet can be received via the gateway node 120. The packet can include gas leak information including gas levels as determined by the gas sensors 220 of the gas sensor node 115 and the location of the gas sensor node 115 as determined by the GPS receiver 225.

In S810, it can be determined if the packet contains gas levels or location of the gas sensor node 115. The packet can also include a checksum value. Whether the packet contains gas levels or location can be determined automatically based on a length of the packet. For example, if the length of the packet corresponds to a first predetermined number of bytes (e.g., 57 bytes), the packet can contain the location of the gas sensor node 115. The location information can include the MAC address, longitudes, and latitudes of the gas sensor node 115. If the length of the packet corresponds to the packet containing a second predetermined number of bytes different from the first predetermined number of bytes (e.g., 32 bytes), then the packet can contain the gas levels. The gas level information can include the MAC address of the gas sensor node 115 and the levels of each of Methane, Carbon Monoxide, and Hydrogen Sulfide gas sensors 220. If the packet is determined to contain the gas levels, then the MAC address of the gas sensor node 115 and the gas levels for each gas sensor 220 in the gas sensor node 115 can be stored locally and/or in the database 140 in S815. If the packet is determined to contain the gas sensor node 115 location, then the MAC address of the gas sensor node 115 and the location of the gas sensor node 115 can be stored locally and/or in the database 140 in S825.

In S815, the MAC address of the gas sensor node 115 can be stored locally and/or in the database 140. The MAC address of each gas sensor node 115 can be unique to that gas sensor node 115, thereby identifying it specifically with respect to other gas sensor nodes 115. The gas levels for each gas sensor 220 in the gas sensor node 115 can be stored locally and/or in the database 140. The packet received by the gateway node 120 can include current gas levels as detected by the gas sensor node 115.

In S820, the MAC address of the gas sensor node 115 and the gas levels can be displayed via the remote device 125, for example. The process can then return to S805 to continuously check the gas levels over time.

In S825, the MAC address can be stored locally and/or in the database 140. The MAC address can correspond to a unique gas sensor node 115 as described in S815. The location of the gas sensor node 115 can be stored locally and/or in the database 140. The location of the gas sensor node 115 can be determined by the MAC address of the gas sensor node 115 due to the MAC address being unique to each gas sensor node 115 and each gas sensor node 115 corresponding to a unique location. For example, the location may be a specific section of pipe on a specific oil rig. The section of pipe on a specific oil rig may be more readable to a human monitoring the remote device 125, and therefore, the location of the gas sensor node can be display in terms that are more easily understood by an operator rather than GPS coordinates, for example.

In S830, the location of the corresponding gas sensor node 115 (i.e., the gas sensor node 115 that detected the gas leak) can be displayed via the remote device 125, for example. S830 can be optional in the event that the location of the gas sensor node 115 has already been displayed in a previous iteration of the method for responding to a gas leak. After the location of the gas sensor node 115 is displayed, the process can return to S805 to continue receiving gas leak information from one or more of the gas sensor nodes 115.

Figure 8B:
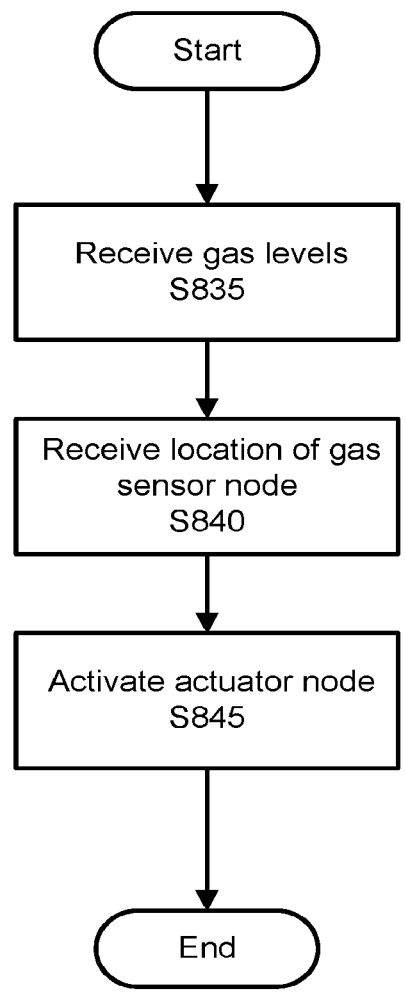
FIG. 8B is an algorithmic flowchart of a method for responding to a gas leak according to one or more aspects of the disclosed subject matter.

FIG. 8B is an algorithmic flow chart of a method for responding to a gas leak according to one or more aspects of the disclosed subject matter.

In S835, the gas levels as detected and broadcast by the gas sensor node 115 can be received by one or more of the remote device 125, the server 130, and the like. For example, the gas sensor node 115 can detect gas levels greater than a predetermined amount of gas corresponding to a gas leak. In response to detecting the gas leak, gas leak information can be broadcast and delivered to the remote device 125, for example. The gas leak information can include the gas levels.

In S840, the location of the gas sensor node 115 that detected the gas leak can be received by one or more of the remote device 125, the server 130, and the like. For example, the gas sensor node 115 can detect gas levels greater than a predetermined amount of gas corresponding to a gas leak. In response to detecting the gas leak, gas leak information can be broadcast and delivered to the remote device 125, for example. The gas leak information can include the location of the gas sensor node 115. In another aspect, the physical location of the gas sensor node 115 can be determined from the MAC address of the gas sensor node 115, which can also be included in the gas leak information.

In S845, one or more actuator nodes 110 can be activated. The actuator node 110 can be activated in response to the location of the gas sensor node 115 that detected the gas leak, thereby turning off the gas valve 155 to stop the flow of gas in the area corresponding to the location of the gas sensor node 115 that detected the gas leak. The gas levels and gas sensor node location received can be received from one or more gas sensor nodes 115, and therefore can cause one or more actuator nodes 110 to be activated throughout one or more areas for which a gas leak was detected. For example, one or more actuator nodes 110 can receive a command corresponding to closing the gas valve 155. The gas valve 155 being closed can correspond to the location of the gas sensor node 115 that detected the gas leak. Each gas valve 155 may be associated with a predetermined area, and a gas leak detected by the gas sensor node 115 in that area may correspond to the gas valve 155 in that area needing to closed to stop the gas leak. The actuator node 110 can also transmit information, such as information corresponding to the location of the gas sensor node 115, for example. After the actuator node 110 has been activated in 845, the process can end.

An advantage of the system 100 is energy awareness. For example, the gas sensor casing 300 can be designed to contain the heat generated by the gas sensor 220 to reduce the amount of time needed to heat the gas sensor 220. Additionally, the adaptive sleep cycle allows the gas sensor node 115 to sleep for a shorter duration when a gas leak is detected to more frequently receive gas levels to more precisely monitor the gas levels over time. Further, the adaptive sleep cycle allows the gas sensor node 115 to sleep for a longer duration when no gas leak is detected to converse energy. Additionally, nodes in the system 100 can be configured to self-diagnose and report any errors as long as they are connected to the network 160. Self-diagnoses can be a process where the microcontroller (e.g., microcontroller 215) can assist in checking the operation of the display, the gas sensors, and the GPS receiver corresponding to the microcontroller 215 via a predetermined test. The microcontroller 215 can use an Analogue to Digital Converter to evaluate the operation of the display, the gas sensor, and the GPS receiver. In another aspect, to test a transceiver (e.g., transceiver 230), the microcontroller 215 can send a message and wait for a response (e.g., ACK/NACK). If no response is received in ten seconds, it may be determined that the transceiver 230 is faulty and a corresponding alert can be displayed in the display 210, for example. Additionally, the node containing the error can be displayed via the remote device 125, for example, to expedite repair. Another advantage of the system 100 can be the gas sensors 220. For example, the gas sensors 220 can include a gas sensor 220 for detection of three separate gases (e.g., Methane, Carbon Monoxide, and Hydrogen Sulfide), thereby increasing the variety of gases the system can measure, and therefore, detect in the event of a gas leak, thereby improving overall safety.

Figure 9:
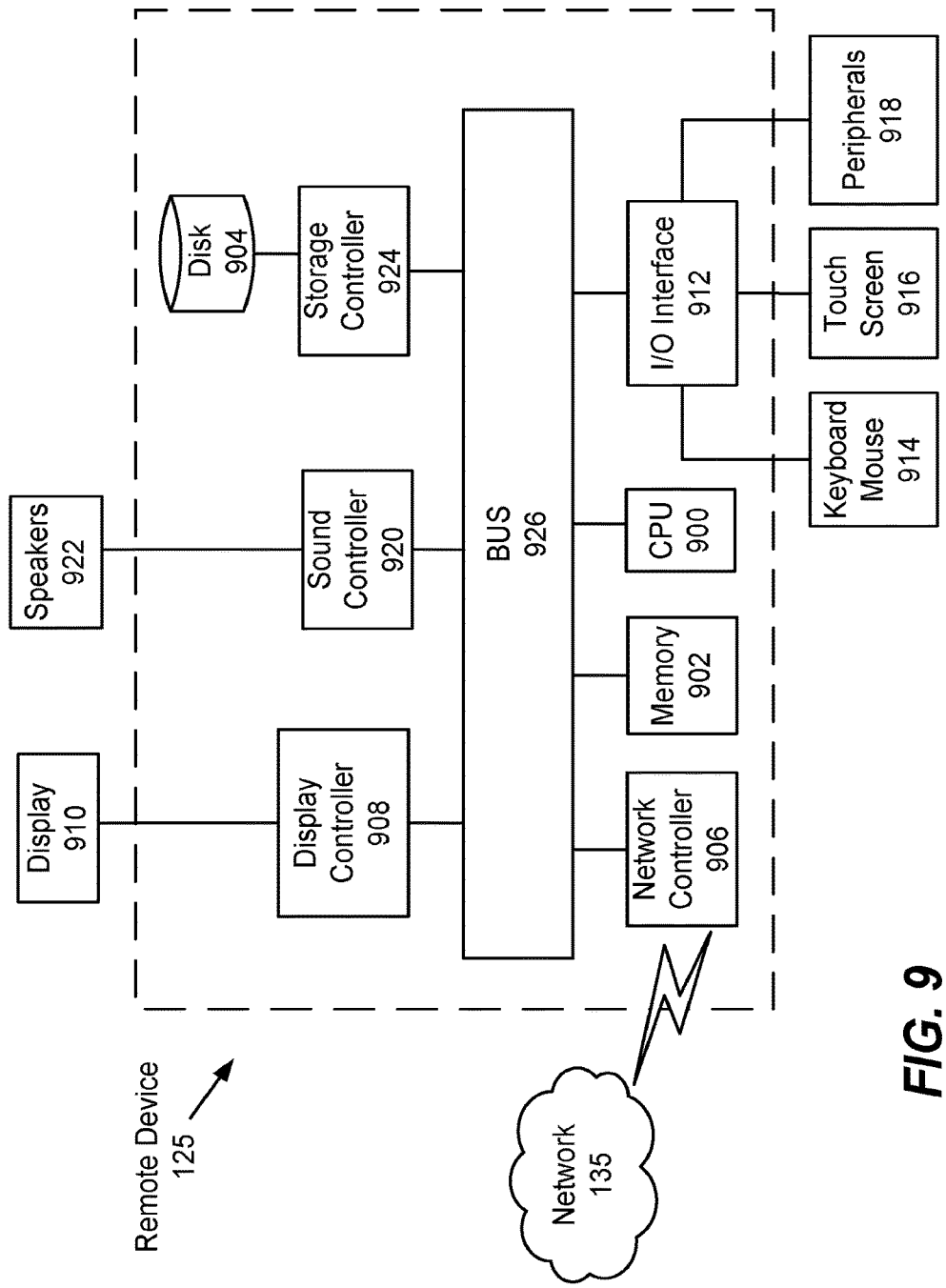
FIG. 9 is a hardware block diagram of a remote device according to one or more exemplary aspects of the disclosed subject matter.

FIG. 9 is a hardware block diagram of the remote device 125 according to one or more exemplary aspects of the disclosed subject matter. Next, a hardware description of the remote device 125 according to exemplary embodiments is described with reference to FIG. 9. In FIG. 9, the remote device 125 includes a CPU 900 which performs the processes described above/below. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote device 125 communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

The hardware elements in order to achieve the remote device 125 may be realized by various circuitry elements, known to those skilled in the art. For example, CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The remote device 125 in FIG. 9 also includes a network controller 906 for interfacing with network 160.

The remote device 125 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the remote device 125, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the remote device 125. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The server 130 can include similar hardware as described in FIG. 9 such that the server 130 can function to operate the system 100.

Having now described aspects of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A gas detection system, comprising:
one or more gas sensor nodes operating based on an adaptive sleep cycle and including one or more gas sensors configured to detect one or more gas leaks, each sensor node including a casing cover, a hydrophobic filter, and a casing body including a thick walled container, the casing cover positioned on the casing body such that the hydrophobic filter covers any opening in the casing body;
one or more actuator nodes communicably coupled to a gas valve;
a gateway node communicably coupled to a remote device;
a network communicably coupling the one or more gas sensor nodes, the one or more actuator nodes, the gateway node, and the remote device; and
the remote device including processing circuitry configured to
receive a packet via the gateway node, the packet including gas information from the one or more gas sensor nodes,
determine whether the packet contains gas information comprising gas level information or gas sensor node location information based on a length of the packet, wherein when the length of the packet corresponds to a first predetermined number of bytes, the packet contains gas sensor node location information and when the length of the packet corresponds to a second predetermined number of bytes different from the first predetermined number of bytes, the packet contains gas level information, and
activate the one or more actuator nodes based on the gas level information or the gas sensor node location information.

2. The gas detection system of claim 1, wherein the gas sensor casing cover in combination with the casing body configured to contain heat generated by a gas sensor and harvest heat from an external surrounding of the casing body and the casing cover.

3. The gas detection system of claim 1, wherein the one or more gas sensor nodes includes gas sensor node processing circuitry to control the adaptive sleep cycle, and
the gas sensor node processing circuitry are configured to
wake the gas sensor node,
determine whether or not a gas leak is detected,
set the gas sensor node to a first sleep mode when the gas leak is not detected,
broadcast a gas level when the gas leak is detected, and set the sensor node to a second sleep mode when the gas leak is detected,
wherein the first sleep mode is longer then the second sleep mode.

4. The gas detection system of claim 3, wherein the first sleep mode is for two minutes.

5. The gas detection system of claim 4, wherein the second sleep mode is for one minute.

6. The gas detection system of claim 1, wherein the gas information includes a MAC address of the gas sensor node and at least one of the gas level information and the gas sensor node location information.

7. The gas detection system of claim 1, wherein the processing circuitry is further configured to
store a MAC address and a gas level corresponding to the one or more gas sensor nodes in response to the gas information including the gas level information,
display the MAC address and the gas level in response to the gas information including the gas level information,
store the MAC address and gas sensor node location corresponding to the one or more gas sensor nodes in response to the gas information including the gas sensor node location information of the one or more gas sensor nodes, and display the MAC address and the gas sensor node location in response to the gas information including the gas sensor node location information of the one or more gas sensor nodes.

8. The gas detection system of claim 1, wherein the one or more actuator nodes are configured to open and close a corresponding gas valve.

9. The gas detection system of claim 1, wherein the one or more gas sensors detect one or more of methane, carbon monoxide, and hydrogen sulfide.

10. A method of gas detection, comprising:
receiving a packet via a gateway node, the packet including gas information from one or more gas sensor nodes, the gas sensor nodes operating based on an adaptive sleep cycle and including one or more gas sensors configured to detect one or more gas leaks, each sensor node including a casing cover, a hydrophobic filter, and a casing body including a thick walled container, the casing cover positioned on the casing body such that the hydrophobic filter covers any opening in the casing body;
determining whether the packet contains gas information comprising gas level information or gas sensor node location information based on a length of the packet, wherein when the length of the packet corresponds to a first predetermined number of bytes, the packet contains gas sensor node location information and when the length of the packet corresponds to a second predetermined number of bytes different from the first predetermined number of bytes, the packet contains gas level information, and
activating one or more actuator nodes communicably coupled to the gateway node based on the gas level information or the gas sensor node location information.

11. The method of claim 10, further comprising:
containing heat generated by a gas sensor using the casing body and the casing cover attached to the casing body, and
harvesting heat from an external surrounding the casing body and the casing cover.

12. The method of claim 11, further comprising:
restricting liquid from entering the casing body via the hydrophobic filter.

13. The method of claim 10, comprising
waking the gas sensor node,
determining whether or not a gas leak is detected,
setting the gas sensor node to a first sleep mode when the gas leak is not detected,
broadcasting a gas level when the gas leak is detected, and
setting the gas sensor node to a second sleep mode when the gas leak is detected,
wherein the first sleep mode is longer than the second sleep mode.

14. The method of claim 13, wherein the first sleep mode is for two minutes.

15. The method of claim 14, wherein the second sleep mode is for one minute.

16. The method of claim 10, wherein the gas information includes a MAC address of the gas sensor node and at least one of the gas level information and the gas sensor node location information.

17. The method of claim 10, further comprising:
storing a MAC address and a gas level corresponding to the one or more gas sensor nodes in response to the gas information including the gas level information;
displaying the MAC address and the gas level in response to the gas leak information including the gas level information;
storing the MAC address and gas sensor node location corresponding to the one or more gas sensor nodes in response to the gas leak information including the gas sensor node location information of the one or more gas sensor nodes; and
displaying the MAC address and the gas sensor node location in response to the gas information including the gas sensor node location information of the one or more gas sensor nodes.

18. The method of claim 10, wherein actuating the one or more actuator nodes includes opening or closing a corresponding gas valve.

19. The method of claim 10, wherein the gas information includes gas level information of one or more of methane, carbon monoxide, and hydrogen sulfide.

20. The gas detection system of claim 1, wherein a height of the casing body is one inch, a width of the casing body is two and three-eighths inches, a width of the casing cover is two and three-eighths inches, and a width of the hydrophobic filter is one inch.

* * * * *